Nov. 23, 1965 C. H. HUGHES 3,219,553
MULTI-STAGE FLASH TYPE EVAPORATORS
Filed Jan. 17, 1961 4 Sheets-Sheet 1
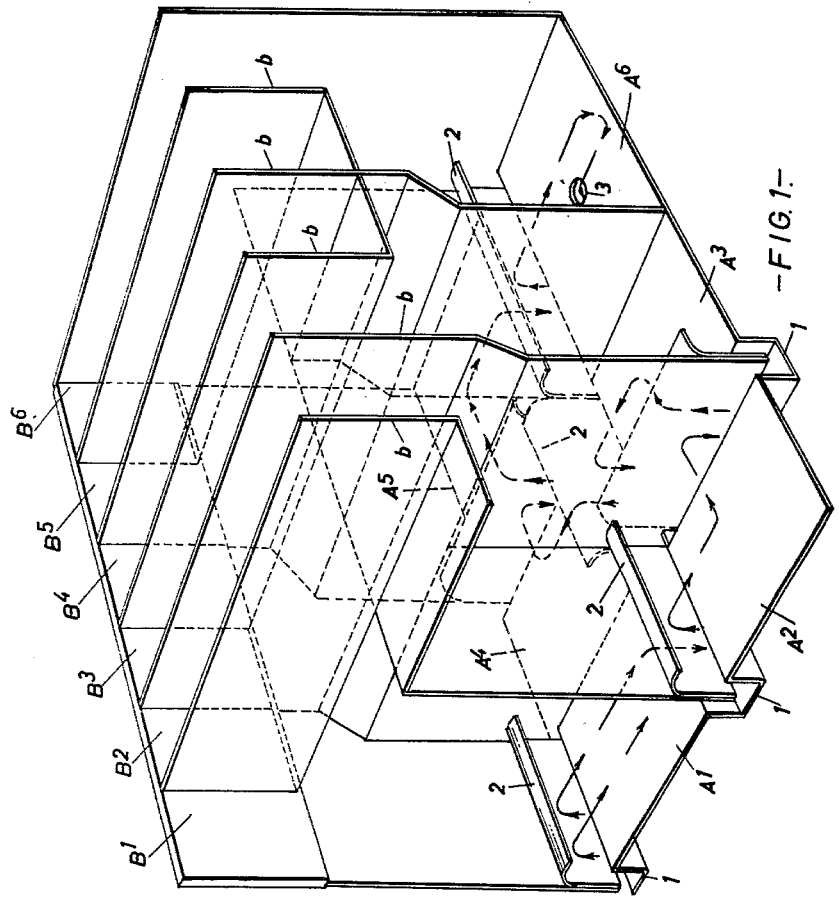
INVENTOR:
CECIL HENRY HUGHES
BY
Norris + Bateman
Attys

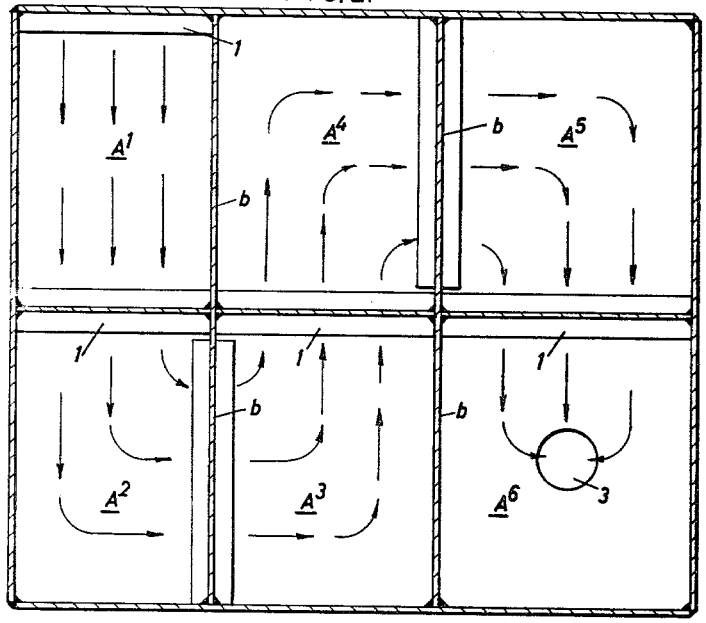
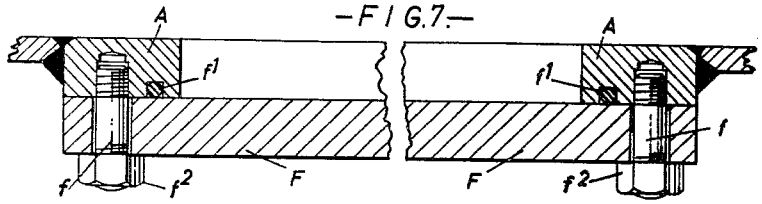
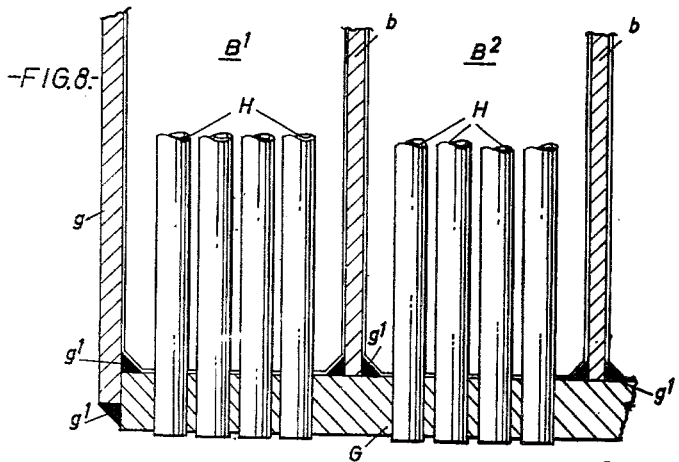

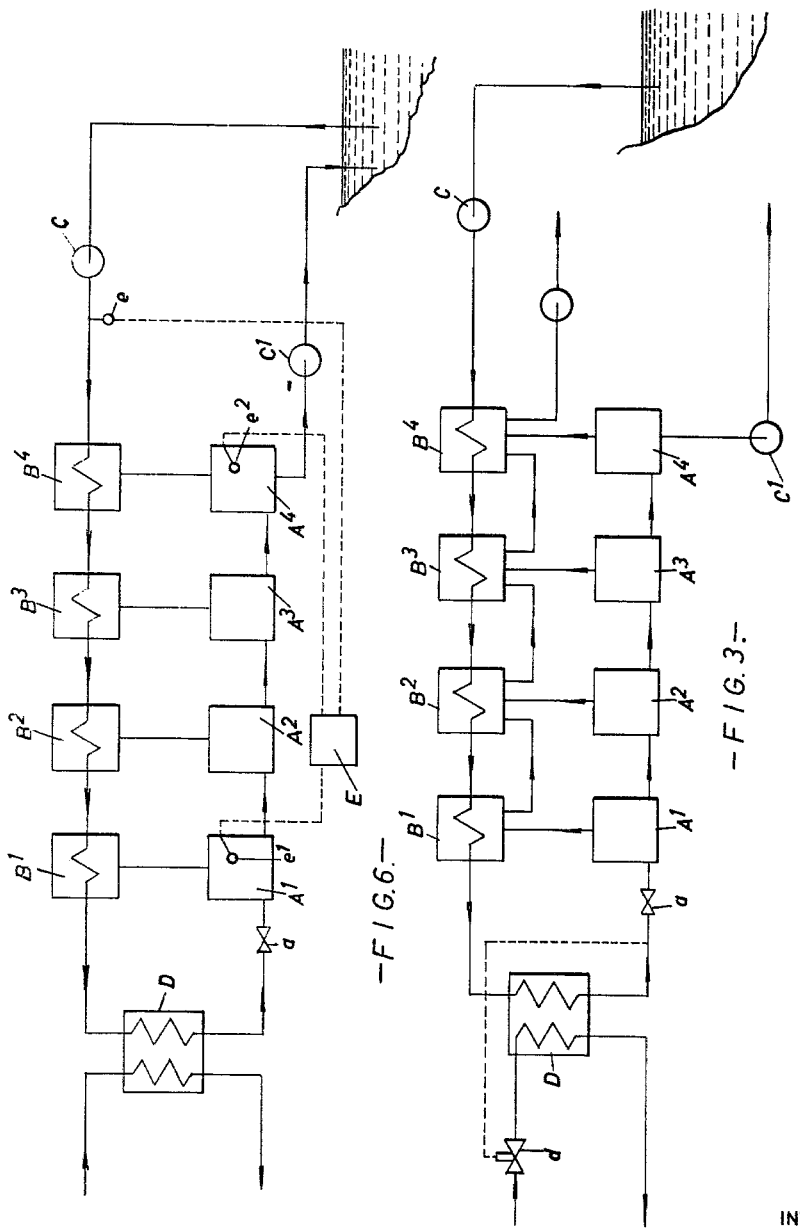

Nov. 23, 1965   C. H. HUGHES   3,219,553
MULTI-STAGE FLASH TYPE EVAPORATORS
Filed Jan. 17, 1961   4 Sheets-Sheet 4
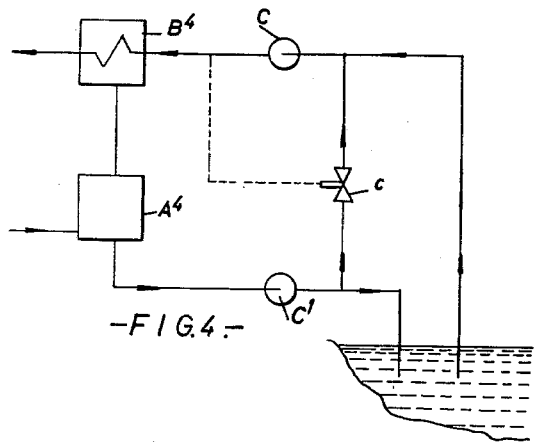
—FIG.4.—
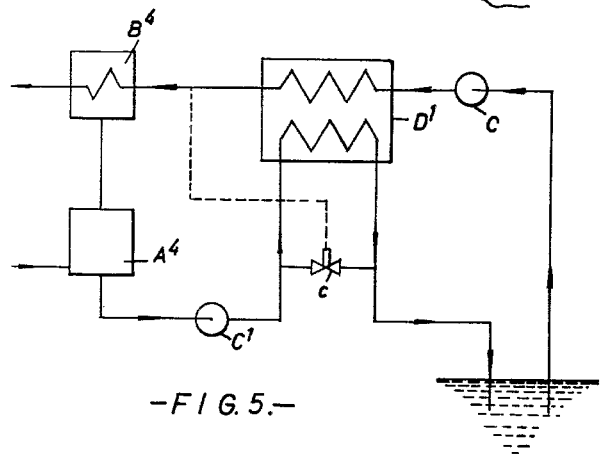
—FIG.5.—
INVENTOR:
CECIL HENRY HUGHES
BY
Norris & Bateman
attys

United States Patent Office 3,219,553
Patented Nov. 23, 1965

3,219,553
MULTI-STAGE FLASH TYPE EVAPORATORS
Cecil Henry Hughes, Sale, England, assignor, by mesne assignments, to American Machine & Foundry Company, New York, N.Y., a corporation of New Jersey
Filed Jan. 17, 1961, Ser. No. 83,215
4 Claims. (Cl. 202—173)

This invention relates to multi-stage flash type evaporators, particularly those for producing distilled water from the sea or other contaminated source, for use either on shipboard or land.

In this type of evaporator it is usual for hot sea water to pass through a series of chambers called flash chambers at successively lower pressure. In each chamber the water entering is at a higher temperature than saturation, and the water flashes, pure vapour being released. The vapour is condensed in a tubular vapour condenser where its latent heat passes into the incoming sea water feed, the temperature of which rises progressively reaching a maximum on leaving the condenser associated with the first chamber in which the water flashed. At this point external heat is added to the sea water feed to raise its temperature sufficiently to ensure that the correct quantity of vapour is produced when it is led into the first flash chamber.

A flash evaporator therefore consists primarily of a number of flash chambers in which water is flashed, and a similar number of associated condensers in which the vapour produced is condensed.

In multi-stage flash type evaporators there is usually a tendency for the vapour passing from a flash chamber to a condenser to carry with it moisture globules in suspension, and one object of the present invention is to prevent or minimize this tendency, and this is achieved by so arranging the flow passage into the first flash chamber and the flow passages between adjacent flash chambers as to cause the liquid to be delivered on to a distributor plate which constrains it into a flat sheeting flowing sensibly horizontally across the flash chamber, thereby creating favourable conditions for the vapour produced to escape to the condenser without carrying moisture globules in suspension therein.

Another feature of the invention is an arrangement of the flash chambers so as to cause the flashing water to have a zig-zag or S passage through the installation, the water being turned through an angle of 90° in passing from one flash chamber to the next thereby enabling the installation to occupy as small an area as possible which on shipboard and in many cases on land is of great importance. The condensers are arranged above the flash chambers, the condensate flowing from the first condenser through the succeeding condensers to the outlet.

Other features of the invention are shown in the accompanying drawings and they and the two features hereinbefore specifically referred to will be described with reference to the said drawings. In these drawings:

FIG. 1 is a diagrammatic isometric view of an evaporator having six flash chambers and a corresponding number of condensers arranged on top of them;

FIG. 2 is a horizontal section of the evaporator illustrated in FIG 1;

FIG. 3 is a diagram illustrating the arrangement of a four-stage evaporator and feed water controlling means therefor;

FIG. 4 is a diagram illustrating a method for the automatic control of the temperature of the sea water being supplied;

FIG. 5 is a diagram showing an alternative method to that shown in FIG. 4.

FIG. 6 is a diagram showing a method of closing down the evaporator should a fault occur in any of the parts thereof;

FIG. 7 is a detail view of a construction of inspection door; and

FIG. 8 is a detail view of the construction of one of the condensers.

In the arrangement shown in FIGS. 1 and 2 the installation has six flash chambers $A^1$, $A^2$, $A^3$, $A^4$, $A^5$ and $A^6$, the water to be flashed entering the chamber $A^1$ and after passing in a zig-zag or S path through the intervening chambers as indicated by the arrows leaving through an outlet in the chamber $A^6$. Six corresponding condensers $B^1$, $B^2$, $B^3$, $B^4$, $B^5$ and $B^6$ are arranged on top of the flash chambers, each condenser extending the length of two flash chambers so that each condenser is twice the length and approximately half the width of a flash chamber. Although FIGS. 1 and 2 show an installation having six flash chambers and six condensers any other desired number could be employed.

The hot sea water enters the first flash chamber $A^1$ through the channel 1 where flashing takes place and then progresses through all the chambers in series following the path indicated by the arrows to the final chamber $A^6$ which it leaves through the outlet 3. Each flash chamber is connected to the next through a channel similar to the channel 1 at the entry to the first chamber $A^1$, flashing taking place as the water flows through each channel.

The flashing process comprises the very rapid formation of vapour bubbles in the water which results in the volume of the water/vapour mixture increasing very rapidly as it flows through the channel, and in order to cause the mixture to flow across the chamber in a flat sheet and thereby create conditions whereby the vapour will rise from the mixture and flow upwards to the condenser without globules of saline water being suspended therein, a distributor plate 2 with a curved upper edge extends into the channel so that the mixture as it rises is directed by the upper edge in a thin layer on the floor of the flash chamber.

In order to minimise the formation of scale during the heating of the sea water feed, it is usual to limit the maximum temperature to which the feed is heated, the highest figure generally being accepted as approximately 190° F. According to a feature of the invention the temperature to which the feed is heated is automatically maintained at a pre-determined value, and the method of achieving this is illustrated in FIG. 3 which shows it applied to a four-stage evaporator. In this figure the four flash chambers $A^1$, $A^2$, $A^3$, $A^4$ are shown in a straight line in order to simplify the diagram, but it is to be understood that they are so shown only for such reason. The sea water feed pump C circulates the sea water through the condensers $B^4$, $B^3$, $B^2$, and $B^1$ and a heater D before it enters the first flash chamber $A^1$. A control valve $d$ which is automatically controlled by the temperature of the water before entering the first flash chamber $A^1$ controls the supply of heating means to the heater D to maintain the temperature of the water entering the chamber $A^1$ at the desired value.

It is usual to control the output of a multi-stage flash evaporator by a feed control valve $a$. If, therefore, it is desired to reduce the output of the evaporator the control valve is throttled, causing a reduction in the supply of heating means to the heater D or the temperature of the feed will rise. In the usual construction of evaporator two adjustments are required to control the output of the evaporator, viz. adjustment of the feed and adjustment of the supply of heat whereas with the automatic arrangement described only control of the feed is necessary since the heat control follows automatically.

Any suitable form of external heat supply to the heater D such as hot gases, steam or hot water can be employed with the previously described method of control.

Multi-stage flash evaporators are usually designed using an estimated mean sea water feed temperature, and it is found that if the feed temperature falls well below the value for which the evaporator is designed the thermodynamic effectiveness of the evaporator is reduced, and a further feature of the invention includes a method for maintaining the sea water feed temperature close to the design value. If, for instance, the evaporator were designed to employ feed water at 80° F., it would usually be economic to prevent the feed temperature falling below about 70° F., and this would be achieved in the following manner: Referring to FIG. 4 the pump $C^1$ extracts the unflashed brine from the last flash chamber $A^4$ and returns it to the sea water source and this brine is rather warmer than the sea water delivered to the condenser $B^4$ by the feed pump C. If the feed temperature from the sea tends to fall below the pre-determined figure, that figure being 70° F. in the example referred to, then an automatic valve C, which is controlled by the temperature of the sea water between the feed pump C and the condenser $B^4$, opens and allows some of the warm brine to join the feed water and prevent the temperature of the latter from falling further.

The quantity of brine so recirculated will vary with the temperature to which the sea falls, and if this temperature fell low enough the quantity of recirculant would be so great as to concentrate unduly the feed water flowing through the evaporator. If this is likely to occur the alternative control shown in FIG. 5 would be incorporated. In this arrangement an auxiliary heat exchanger $D^1$ is arranged between the feed pump C and the condenser $B^4$. The heat exchanger $D^1$ is heated by the warm brine from the brine extraction pump $C^1$. The amount of heat transferred is controlled by the bypass valve $c^1$ which allows sufficient brine through the heat exchanger to prevent the feed temperature into the evaporator from falling below the pre-determined value.

As stated earlier, practically any source of heat can be used to operate a flash type evaporator, and this invention relates to such an evaporator using oil fuel or gas. It is usual either to burn such fuels in a combustion chamber and use the gaseous products of combustion as the heating medium, or to employ a boiler using the fuel to produce steam, which is then used as the heating medium. A feature of the present invention is that the fuel is burnt in a burner immersed in the sea water feed, the heat passing into that feed by direct contact. The feed is then passed into a chamber where the combustion products remaining are allowed to escape, together with any gases which may have come out of solution from the sea water during the heating process.

The multi-stage flash evaporator according to the invention is extremely stable whilst operating, and the tendency is therefore to run it with little or no attendance. Under these conditions any failure could cause serious damage before it was observed, and a further feature of this invention is a method of control to cause automatic shut-down of the evaporator in the event of a fault developing. The method is shown diagrammatically in FIG. 6 and includes a control panel E which can automatically stop all the motors driving the various pumps of the installation and cut off the supply of the medium.

The arrangement illustrated operates as follows: Should the feed pump C stop because of a fault, e.g. a burn-out of the driving motor, a pressure switch $e$ would detect the fall in feed pressure and relay a signal to the control panel, causing the evaporator to shut down. This would prevent danger of overheating in the feed heater D due to failure of the feed supply.

Shut down of the plant would similarly be actuated by flooding of either the first or last flash chamber, detected by the level switches $e^1$ and $e^2$ respectively, which are again connected to the control panel E. Level switch $e^2$ would operate if the brine extraction pump $C^1$ failed, causing the last flash chamber $A^4$ to flood. Level switch $d^1$ would operate if a blockage between flash chambers occurred causing flooding of the first flash chamber $A^1$.

The invention also includes two features relating to the manufacturing problems associated with multi-stage flash type evaporators. It is essential to reduce any air leakage into such evaporators, which operate under vacuum, to an absolute minimum, because any air inside the evaporator makes it made difficult to maintain a high vacuum and also impairs the heat transfer properties of the condensing vapour. An inspection door is necessary in each flash chamber, and such an inspection door is shown in FIG. 7 designed to ensure complete airtightness whilst still being easy to fit and remove. In this arrangement the inspection door F, which is secured in position on the studs $f$ cooperates with a sealing device $f^1$ comprising an O ring of resilient material which compresses when the nuts $f^2$ on the studs $f$ are tightened. It is generally only necessary to apply light pressure via the nuts, since under operating conditions the vacuum inside the chamber draws the inspection door down on to the O ring, producing a perfect seal. In a chamber where the vacuum is not very high, the additional load required to be produced in the O ring by the nuts can easily be calculated, and the necessary torque applied on the nuts.

The second constructional feature referred to relates to the vapour condensers B each of which consists of tube bundles running across the condenser as shown in FIG. 8, the condensers being separated from one another by the division plates $b$, and the tube ends being expanded into tube plates which are usually of non-ferrous material collar-bolted to a flange on the vessel. This produces a large joint which it is difficult to make completely airtight, and the object of the aforesaid constructional feature is to overcome the difficulty of making the joint airtight.

As shown in FIG. 8 the tube plate G is made of ferrous metal usually mild steel, is welded directly into the shell of the vessel by light welds $g^1$ which tie it to the shell $g$ and the division plates $b$ and also act as seals between the atmosphere and the inside of the vessel, and between adjacent condensers $B^1$, $B^2$.

The ends of the tubes H which are of non-ferrous material are expanded into the tube plate G of ferrous material.

All ferrous parts of the condenser are coated to prevent corrosion and for electrical insulation from the non-ferrous tubes to prevent electrolytic action in the sea water circuit.

I claim:

1. In a flash evaporator, a plurality of flash chambers arranged in a horizontal series for flow of feed water therethrough and an equal number of condensers arranged above the chambers, a substantially horizontal flat floor in each of said chambers, the chamber floors being at substantially the same level, a feed water inlet and a feed water outlet for each chamber at the lower portion thereof, a channel from the outlet of each but the last chamber of the series to the inlet of the adjacent chamber, said channel extending transversely to and substantially across the flow path, an intermediate portion of each channel extending below the level of the chamber floors, and a horizontal baffle disposed above each chamber inlet in relatively close proximity to the chamber floor directing flashing liquid flowing through said chamber in a horizontal sheet over the chamber floor.

2. In a multi-stage flash-type evaporator, a horizontal series of substantially rectangular flash chambers for flow of feed water therethrough and associated condensers arranged above the chambers, a substantially flat horizontal floor in each chamber, said floors being at substantially the same level, a feed water inlet and a feed water outlet in the floor of each chamber, a channel connecting the outlet of each chamber but the last to the inlet of the adjacent chamber, each channel being disposed entirely below chamber floor level and extending transversely to and substantially across the flow path, and a horizontal baffle disposed above the inlet of each chamber in close proximity to the chamber floor diverting flashing liquid entering each chamber into a horizontal sheet over the chamber floor.

3. In a flash evaporator having a plurality of flash chambers arranged in a horizontal series for flow of feed water therethrough and an equal number of condensers arranged above the flash chambers, an upstream end wall, a downstream end wall and a plurality of interposed spaced vertical partitions defining the flash chambers, a common substantially flat horizontal bottom wall for said flash chambers, said bottom wall being provided below each partition and below the line of said bottom wall with a channel extending substantially the length of each partition and substantially across the flow path, each partition extending down into its associated channel whereby to define between adjacent chambers a downstream outlet for one chamber and an upstream inlet for the other chamber, and a horizontal baffle extending from each partition over the inlet of each chamber in relatively close proximity to the chamber floor diverting flashing liquid entering each chamber from the channel into a horizontally flowing sheet on the chamber floor.

4. A multi-stage flash type evaporator comprising a series of flash chambers through which the flow of liquid assumes a zig-zag path and an equal number of condensers arranged above the flash chambers, each of said flash chambers having a substantially flat horizontal bottom, a channel for the entrance of liquid to the bottom of each chamber, said channel being located below the level of the chamber bottom and extending transversely to and substantially across the flow path, a vertical distributor plate extending upwardly from each channel and having its upper portion curved in the direction of flow of liquid, whereby liquid entering each flash chamber is caused to flow substantially horizontally in a flat sheet over the floor of the flash chamber, and means for controlling the temperature of the feed water to be flashed, to maintain it at a substantially constant temperature, said temperature controlling means including means for flowing feed water from a source of supply, means for flowing unflashed water from the evaporator to the feed water flowing means, and a valve in said last mentioned means, responsive to the temperature of the combined feed water and unflashed water for regulating the flow of the unflashed water.

References Cited by the Examiner
UNITED STATES PATENTS

| 101,365 | 3/1870 | Thumm | 202—172 |
| 2,357,113 | 8/1944 | Houghland et al. | 202—160 |
| 2,508,434 | 5/1950 | Storment | 202—206 X |
| 2,509,136 | 5/1950 | Cornell | 202—160 X |
| 2,944,599 | 7/1960 | Frankel | 202—53 |
| 3,003,931 | 10/1961 | Worthen et al. | 202—53 X |
| 3,102,062 | 8/1963 | Graham et al. | 202—160 |

FOREIGN PATENTS

| 859,153 | 12/1952 | Germany. |

OTHER REFERENCES

Flash Evaporators for The Distillation of Sea-Water, A. Frankel, 1959, The Instit. of Mechanical Engin., page 10.

NORMAN YUDKOFF, *Primary Examiner.*

ALPHONSO D. SULLIVAN, *Examiner.*